United States Patent
Kobayashi

(10) Patent No.: US 7,219,075 B2
(45) Date of Patent: May 15, 2007

(54) LENS ORDERING METHOD AND LENS ORDERING SYSTEM

(75) Inventor: Masahiko Kobayashi, Aichi (JP)

(73) Assignee: Nidek Co., Ltd., Gamagori, Aichi (JP)

( * ) Notice: Subject to any disclaimer, the term of this patent is extended or adjusted under 35 U.S.C. 154(b) by 441 days.

(21) Appl. No.: 10/413,221

(22) Filed: Apr. 15, 2003

(65) Prior Publication Data
US 2003/0225478 A1 Dec. 4, 2003

(30) Foreign Application Priority Data
Apr. 16, 2002 (JP) .................... P .2002-113733

(51) Int. Cl.
*G06Q 30/00* (2006.01)
(52) U.S. Cl. ............... 705/26; 705/27; 705/28; 705/29
(58) Field of Classification Search ........... 705/26, 705/27, 28, 29; 351/169, 176
See application file for complete search history.

(56) References Cited

U.S. PATENT DOCUMENTS

| | | | | |
|---|---|---|---|---|
| 2,180,887 | A | * | 11/1939 | Tillyer .................... 351/176 |
| 4,958,280 | A | * | 9/1990 | Pauly et al. .................. 705/3 |
| 6,064,981 | A | * | 5/2000 | Barni et al. .................. 705/26 |
| 6,199,983 | B1 | * | 3/2001 | Kato et al. .................. 351/169 |
| 6,637,880 | B1 | * | 10/2003 | Yamakaji et al. ........... 351/177 |
| 6,692,127 | B2 | * | 2/2004 | Abitbol et al. .............. 351/227 |
| 2001/0042028 | A1 | * | 11/2001 | Yoshida ..................... 705/27 |
| 2002/0039171 | A1 | * | 4/2002 | Shtrayanagi et al. ........ 351/159 |
| 2004/0064376 | A1 | * | 4/2004 | Yoshida ..................... 705/26 |

FOREIGN PATENT DOCUMENTS

| | | |
|---|---|---|
| EP | 1 154 302 A1 | 11/2001 |
| JP | 2000-123080 | 4/2000 |
| WO | WO/00/48035 | 8/2000 |

OTHER PUBLICATIONS

"Buying contact lenses by phone, mail or the Internet", Lewis, Carol, FDA Consumer, Sep./Oct. 2001, vol. 35, Iss. 5, p. 30.*

* cited by examiner

*Primary Examiner*—Michael Cuff
*Assistant Examiner*—M. Thein
(74) *Attorney, Agent, or Firm*—Finnegan, Henderson, Farabow, Garrett & Dunner LLP

(57) ABSTRACT

A lens ordering system for submitting an order for a refractive lens online, using a terminal device installed at an order submission source, the lens ordering system includes: a server which displays an input screen, into which power of a lens to be ordered is entered, on a monitor of the terminal device; and a database which stores power data of the lenses available from a lens supply source. The server displays a power range table in which spherical power and astigmatism powers are arranged in columns and rows based on the power data, and automatically enters the spherical power and the astigmatism power corresponding to an intersection section at the same time by designating one of the intersection sections of the columns and rows of the power range table.

11 Claims, 4 Drawing Sheets

FIG. 2

```
ORDER
PROCESSING :  [ NEXT ]      [ RETURN ]

ORDERING DESTINATION : XXX COMPANY
```

| PURCHASE DESTINATION | MACHINING DESTINATION | DISPATCHING DESTINATION |
|---|---|---|
| XXX COMPANY ▼ | XXX COMPANY ▼ | ▼ |

LENS                                      MAKER  [XXX COMPANY ▼]

| MACHINING | ☐ THIN TYPE GRINDING | ☑ TRACED OUTLINE MACHINING |
|---|---|---|

| R<->L | PRODUCT NAME | PRODUCT CODE | VOLUME | UNIT PRICE |
|---|---|---|---|---|
| ☑ R | △△△ | LG0001 | 1 | |
| ☑ L | △△△ | LG0001 | 1 | |

( LIST )

FIG. 3

ORDERING PROCESSING: [NEXT]  [RETURN] — 146

LENS (TRACED OUTLINE MACHINING)

| | MAKER | PRODUCT NAME | |
|---|---|---|---|
| R | XXX COMPANY | △△△ | ① |
| L | XXX COMPANY | △△△ | ① |

130, 131, 140b

PRESCRIPTION  (+)  (−)  (MIX) — 140a, 140c

| R<->L | S POWER | C POWER | AXIAL POWER |
|---|---|---|---|
| R | | | |
| L | | | |

132, 133, 134

FITTING

| R<->L | PD [1/2PD▼] | EP [TYPE 1▼] |
|---|---|---|
| R | | |
| L | | |

142

OPTION  (DYE)

| PROCESSING | | |
|---|---|---|
| UV400 | COATING | OPTIMAL MACHINING |
| ☐ | [▼] | ☐ |

144

LENS ORDERING METHOD AND LENS ORDERING SYSTEM

BACKGROUND OF THE INVENTION

The present invention relates to a lens ordering method and to a lens ordering system suitable for the on-line ordering of refractive lenses, such as lenses for spectacles.

Generally, spectacle retailers have used telephone or facsimile to forward orders for spectacle lenses to spectacle lens makers or wholesalers. Recently, however, as the use of computer and electronic communication device has spread, the submission of orders is increasingly being performed on-line, using available communication device, by employing terminals installed at spectacle retailers.

However, when ordering lenses on-line, a keyboard or a mouse must be used to select and enter numerical values, such as spherical power (S power) and astigmatism power (C power), which include either a + or a − sign. Therefore, there is some trouble in which troublesome manual labor is required to enter numbers and signs, and input errors tend to occur. Further, to determine whether the maker will be able to supply (manufacture) the lenses and provide the required lens diameters for which an order is submitted, the determination should be made by referring to printed material separately provided by the maker, and it is a troublesome job.

SUMMARY OF THE INVENTION

To solve these shortcomings, there is an object of the present invention to provide a lens ordering method and a lens ordering system that can reduce the required labor and the accompanying input errors, and that can improve the efficiency and accuracy with which orders are submitted.

In order to solve the aforesaid object, the invention is characterized by having the following arrangement.

(1) A lens ordering method of submitting an order for a refractive lens online, using a terminal device installed at an order submission source, the lens ordering method comprising the steps of:
displaying a power range table in which spherical powers and astigmatism powers are arranged in columns and rows, on an input screen into which power of a lens to be ordered is entered and which is displayed on a monitor of the terminal device, based on power data of the lenses available from a lens supply source; and
automatically entering the spherical power and the astigmatism power corresponding to an intersection section at the same time by designating one of the intersection sections of the columns and rows of the power range table.

(2) The lens ordering method according to (1), wherein in the displaying step, a lens diameter corresponding to each intersection section of column and row of the power range table is displayed.

(3) The lens ordering method according to (1), wherein in the displaying step, the power range table is displayed so that stock range and special order range of the lens supply source can be identified.

(4) The lens ordering method according to (1), wherein in the displaying step, the power range table is displayed so that negative values and positive values of lenses are discriminated.

(5) The lens ordering method according to (1), wherein in the entering step, the spherical powers and the astigmatism powers of both left and right lenses are automatically entered at the same time.

(6) A lens ordering system for submitting an order for a refractive lens online, using a terminal device installed at an order submission source, the lens ordering system comprising:
a server which displays an input screen, into which power of a lens to be ordered is entered, on a monitor of the terminal device; and
a database which stores power data of the lenses available from a lens supply source,
wherein the server displays a power range table in which spherical power and astigmatism powers are arranged in columns and rows based on the power data, and automatically enters the spherical power and the astigmatism power corresponding to an intersection section at the same time by designating one of the intersection sections of the columns and rows of the power range table.

(7) The lens ordering system according to (6), wherein the server displays a lens diameter corresponding to each intersection section of column and row of the power range table.

(8) The lens ordering system according to (6), wherein the server displays the power range table so that stock range and special order range of the lens supply source can be identified.

(9) The lens ordering system according to (6), wherein the server displays the power range table so that negative values and positive values of lenses are discriminated.

(10) The lens ordering system according to (6), wherein the server automatically enters the spherical powers and the astigmatism powers of both left and right lenses at the same time.

BRIEF DESCRIPTION OF THE DRAWINGS

FIG. 2 is a diagram showing an example first ordering screen.

FIG. 3 is a diagram showing an example second ordering screen.

DETAILED DESCRIPTION OF PREFERRED EMBODIMENTS

Figure 1:
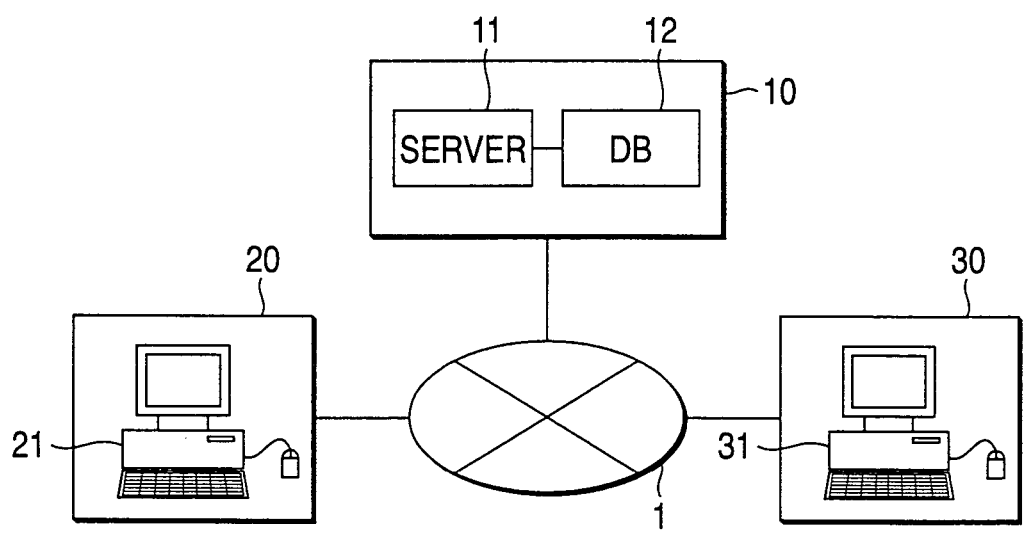
FIG. 1 is a schematic diagram showing the configuration of a lens ordering system according to the present invention.

An embodiment according to the present invention will now be described with reference to the drawings. FIG. 1 is a schematic diagram showing the configuration, according to the present invention, of a lens ordering system for which the Internet 1 is employed as a communication unit.

A terminal device 21, which is located at a spectacle retailer 20 and which is used to submit orders for lenses, and a terminal device 31, located at a supplier, spectacle lens maker (or a wholesaler) 30, are respectively connected to a WEB server 11, which is located at a WEB site 10 and through which the spectacle retailer 20 and the spectacle lens maker 30 communicate with each other. The each terminal device 21 and 31 is computer provided with a display monitor and an input instruction device, such as a keyboard or a mouse. In FIG. 1, only one spectacle retailer 20 and one lens maker 30 are shown; however, the terminal devices of multiple clients can be connected to and can communicate with the WEB server 11. In this embodiment, the lens maker 30 also serves as a spectacle lens machining company; however, the lens maker 30 and the lens machining company may be constituted by different facilities, and it is assumed that a terminal device located at a separate lens machining company may also be connected to and communicate with the WEB server 11.

The terminal device 21 at the spectacle retailer 20 can execute lens order processing by referring to an order homepage prepared by the WEB server 11, by employing a WEB application running on a WEB browser, such as Internet Explorer, Netscape Navigator, etc. A database server (DB server) 12, for storing data for products produced by various lens makers, and order reception and submission data, is located at the WEB site 10 and is connected to the WEB server 11.

To order lenses using the terminal device 21 at the spectacle retailer 20, an operator accesses the order homepage on the WEB server 11. Then, a log-in screen is displayed on the monitor of the terminal device 21, and the operator enters an ID and a password which are provided in advance and logs in to a first ordering screen (page), an example of which is shown in FIG. 2. The operator then fills a lens purchase destination section 101 with a purchase destination, a lens machining destination section 102 with a machining destination, and a lens maker section 103 with a lens maker. To fill these sections, the operator can select relevant destinations stored in the DB server 12 in advance (by using a pull-down button provided adjacent to each section). The operator fills a product name section 105 with a product name for a lens and a product code section 106 with a product code. When the operator clicks a list button 108, the product names and the product codes, which are provided by the lens maker designated in the lens maker section 103, are retrieved from the DB server 12 and are displayed as a list. Then, when traced outline machining is to be ordered at the same time, a tick mark is entered for a traced outline machining block 110.

When the operator has entered the required information and has clicked a "next" button 120 to shift to the next screen (page), a second ordering screen (page) is displayed. FIG. 3 shows a diagram for an example second ordering screen. A lens maker section 130 and a product name section 131 are filled with the data entered for the first ordering screen. On this screen, the prescription values for a lens to be ordered are entered in an S power section 132, a C power section 133 and an axial angle section 134, respectively. While these prescription values can be respectively entered by using a keyboard for lenses R (right eye) and L (left eye), a lens power input screen, including a power range table for lenses that can be supplied (produced) in accordance with the product names assigned by the lens makers that were previously entered, can be displayed by clicking a "+" button 140a, a "−" button 140b or an "MIX" button 140c.

Figure 4:
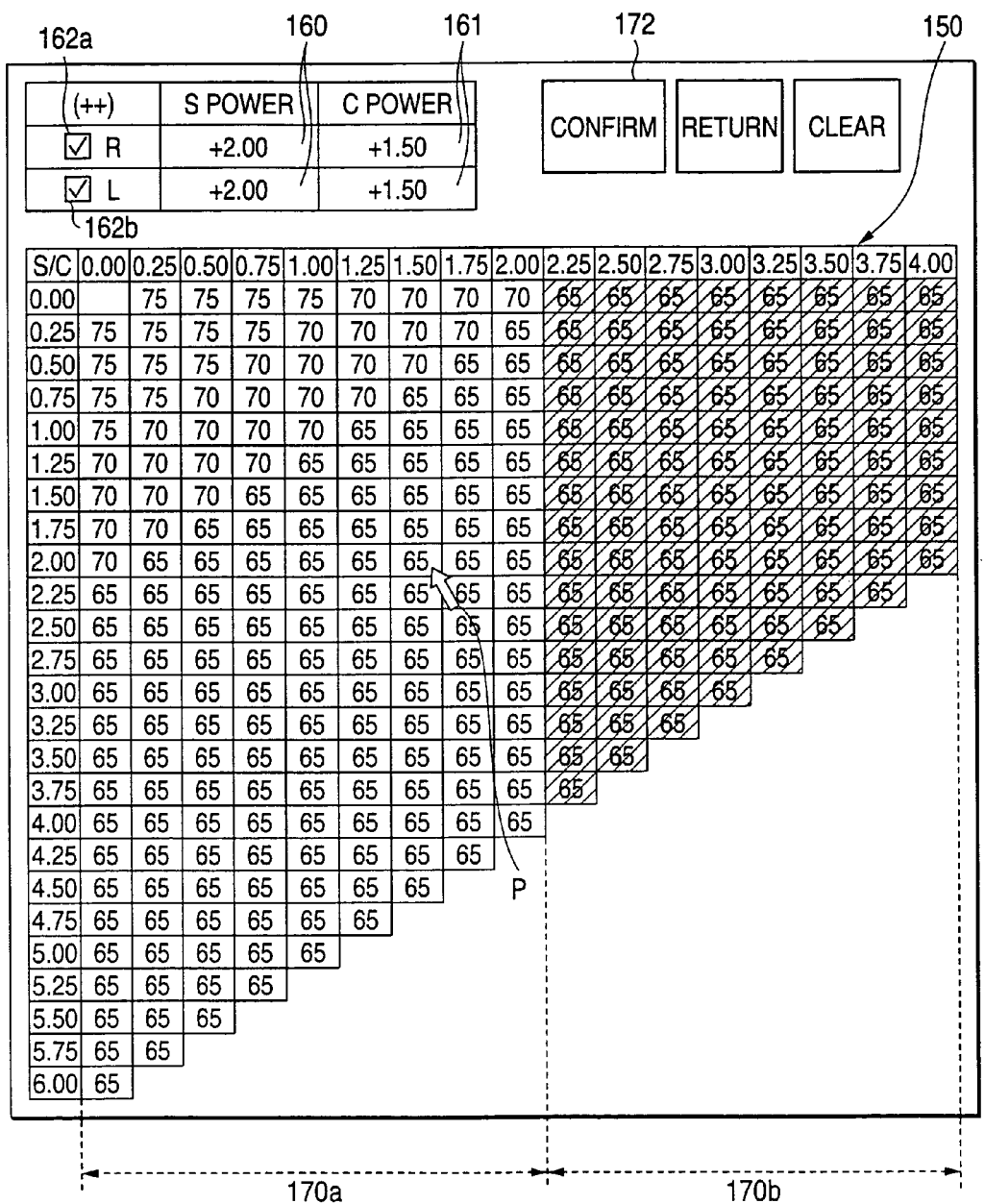
FIG. 4 is a diagram showing an example lens power input screen.

FIG. 4 is a diagram showing an example of the lens power input screen displayed by clicking the "+" button 140a. On this screen, a power range table 150 having a matrix shape is presented wherein the S power is represented by columns and the C power is represented by rows. Alternatively, however, the S power and the C power may be respectively represented by rows and columns. In this example, the individual power are provided as steps of 0.25 D (diopter); however, they can also be provided as steps of 0.125 D. When the "+" button 140a is clicked, the power range table 150 in which the lenses which can be supplied have positive S power and positive C power. Numerical values, such as "75", "70" and "65", representing lens diameters (in millimeter units) are input at each intersection sections (cells) whereat the S and the C power intersect. The sections (cells) whereat the numerical values of the lens diameter are entered are combinations of the S and the C power that can be supplied. When the "−" button 140b is clicked, the power range table 150 is displayed in which the lenses that can be supplied have negative S power and negative C power. When the "MIX" button 140c is clicked, the range table 150 is displayed in which the lenses that can be supplied have positive S power and negative C power. The data provided in the range table 150 are stored in advance in the DB server 12 for each named product available from a lens maker, and are retrieved by entering the names of the lens maker and the product.

To input the S and the C power on the screen, a pointer P is moved to and clicked on an intersection section (cell) whereat the desired S and C power intersect. Through this manipulation, the value of the S power in the corresponding column is entered in an S power column 160, while at the same time, the value of the C power in the corresponding row is entered in a C power column 161. When tick marks are entered in advance in both an R lens power block 162a and an L lens power block 162b, only one operation is required to enter the same value for both the R and L lenses. To separately enter a value for these lenses, an unnecessary tick mark is canceled. In FIG. 4, the individual values are entered by clicking a intersection section (cell) whereat S=+2.00 D and C=+1.50 intersect. Since the signs "+" and "−" are set by clicking the "+" button 140a and the "−" button 140b in advance, excessive input labor can be eliminated and input errors can be prevented. Since only those powers that can be supplied are displayed in the range table 150, the entry of a power outside the range can also be prevented.

The range table 150 is so provided that a range for the lenses that a lens maker normally has in stock and a range for special lenses that the maker prepares upon the reception of an order can be identified. In FIG. 4, a range 170a, for the C powers 0.00 to 2.00 D, indicates the on-hand stock range, while a range 170b, for the C powers 2.25 to 4.00 D, indicates the special order range. Since the cells in the on-hand stock range 170a and the cells in the special order range 170b are displayed in different colors, it is easy to determine whether lenses to be ordered fall in the on-hand stock range 170a or in the special order range 170b. In addition, with these screen displays, the input operation and the confirmation operation can be performed at the same time.

Upon completion of entering the S and the C powers in accordance with the range table 150, a "confirm" button 172 is clicked. Thereafter, the display screen is changed to the second ordering screen in FIG. 3, in which the values entered by using the screen in FIG. 4 are already shown in the S power section 132 and the C power section 133. On the second ordering screen, processing required for ordering lenses can be entered in fitting sections 142 and option sections 144. Then, upon completion of the entries on the second ordering screen, a "next" button 146 is clicked, and since at this time a lens order confirmation screen is displayed, a predetermined input operation can be performed and order data can be transmitted to the WEB server 11. To order the traced outline machining at the same time, traced outline data obtained by tracing a spectacle frame or a template are also transmitted together. It should be noted that the lens power input screen shown in FIG. 4 is also employed to order lenses that are in stock, and that the WEB server 11 both records order data in the DB server 12 and transmits it, via the Internet 1, to the terminal device 31 of the designated lens maker 30.

The thus described lens ordering method and lens ordering system can be employed for ordering not only lenses for spectacles but also refractive lenses, including contact lenses. Instead of using the Internet, a terminal device located at a lens ordering source and a management server (host computer) located at a lens supplier may employ a private line to communicate with each other.

As is described above, according to the present invention, both the labor required to prepare a lens order and the errors that occur during this process can be reduced, while the efficiency and the accuracy with which a lens order is submitted can be improved.

What is claimed is:

1. A lens ordering method of submitting an order for a refractive lens online, using a terminal device installed at an order submission source, the lens ordering method comprising the steps of:

prior to customer selection of spherical power and astigmatism power for a refractive lens to be ordered, displaying a power range table in which different spherical powers and different astigmatism powers are arranged in columns and rows on a monitor of the terminal device, wherein the power range table is generated based on power data of refractive lenses available from a lens supply source;

selecting, by a customer via the terminal device, an intersecting cell from the power range table to automatically enter into an order a refractive lens having spherical power and astigmatism power corresponding to the intersection cell selected; and submitting, by the customer, the order.

2. The lens ordering method according to 1, wherein in the displaying step, a lens diameter corresponding to each intersection cell of the columns and rows of the power range table is displayed.

3. The lens ordering method to 1, wherein in the displaying step, the power range table is displayed so that stock range and special order range of the lens supply source can be identified.

4. The lens ordering method according to 1, wherein in the displaying step, the power range table is displayed so that a table in which the spherical powers and the astigmatism powers are negative values, a table in which the spherical powers and the astigmatism powers are positive values, and a table in which the spherical powers are positive values and the astigmatism powers are negative values are discriminated.

5. A lens ordering system for submitting an order for a refractive lens online, using a terminal device installed at an order submission source, the lens ordering system comprising:

a server which displays an input screen, into which power of a refractive lens to be ordered is entered, on a monitor of the terminal device; and a database which stores power data of refractive lenses available from a lens supply source, wherein prior to customer selection of spherical power and astigmatism power for a refractive lens to be ordered, the server displays a power range table in which different spherical powers and different astigmatism powers are arranged in columns and rows on the input screen and wherein the power range table is generated based on the stored power data, a customer selects an intersection cell from the power range table to automatically enter into an order a refractive lens having spherical power and astigmatism power corresponding to the intersecting cell selected, and the customer submits the order.

6. The lens ordering system according to 5, wherein the server displays a lens diameter corresponding to each intersection cell of the columns and rows of the power range table is displayed.

7. The lens ordering system according to 5, wherein the server displays the power range table so that stock range and special order range of the lens supply source can be identified.

8. The lens ordering system according to 5, wherein the server displays the power range table so that a table in which the spherical powers and the astigmatism powers are negative values, a table in which the spherical powers and the astigmatism powers are positive values, and a table in which the spherical powers are positive and the astigmatism powers are negative values are discriminated.

9. A lens ordering system for enabling submission of an order and acceptance of the order for a refractive lens online, the lens ordering system comprising:

a web server for communicating with a first terminal device having a display monitor and an input instruction device provided at a lens retailer via Internet, and for communicating with a second terminal device provided at a lens supplier via Internet or a private line;

a database server connected to the web server, for storing power data of refractive lenses available from the lens supplier; and a means for providing a web page including an input screen into which power of a refractive lens to be ordered is entered, in which the first terminal device which is an order device can browse and access the web page using a web browser, wherein means for providing, prior to customer selection of spherical power and astigmatism power for a refractive lens to be ordered, a power range table in which different spherical powers and different astigmatism powers are arranged in columns and rows on the input screen wherein the power range table is generated based on the stored power data, when an intersection cell among intersection cells of the columns and rows of the power range table is selected by the input instruction device of the first terminal device, spherical power and astigmatism power corresponding to the selected intersection cell is automatically entered into an order, and the order is submitted.

10. A lens ordering system for enabling submission of an order and acceptance of the order for a refractive lens online, the lens ordering system comprising:

a web server for communicating with a first terminal device having a display monitor and an input instruction device provided at a lens retailer via Internet, and for communicating with a second terminal device provided at a lens supplier via Internet or a private line;

a database server connected to the web server, for storing power data of refractive lenses available from the lens supplier; and a means for providing a web page in which put screen into which power of a refractive lens to be ordered is entered and a selection screen, in which the first terminal device is an order device can browse and access the web page using a web browser, wherein means for providing, prior to customer selection of spherical power and astigmatism power for a refractive lens to be ordered, a power range table in which different spherical powers and different astigmatism powers are arranged in columns and rows on the selection screen wherein the power range table is generated based on the stored power data, when an intersection cell among intersection cells of the columns and rows of the power range table is selected by the input instruction device of the first terminal device, spherical power and astigmatism power corresponding to the selected intersection cell is automatically entered into an order in the input screen, and the order is submitted.

11. A lens ordering system comprising:

a web server for communicating with a first terminal device having a display monitor and an input instruction device via Internet, and for communicating with a second terminal device via Internet or a private line;

a database server connected to the web server, for storing power data of refractive lenses; and a means for providing a web page, in which the first terminal device which is an order device can browse and access the web page using a web browser;

a first input screen control means for displaying a first input screen in which a kind of a pair of right-and-left lenses, spherical power and astigmatism power of each of the right-and-left lenses as a lens prescription value are to be entered, and a first button for displaying a second input screen in which spherical power and astigmatism power of each of the right-and-left lenses are to be selected;

a second input screen display control means for displaying, prior to customer selection of spherical power and astigmatism power for a refractive lens to be ordered the second input screen including a power range table in which different spherical powers and different astigmatism powers are arranged in columns and rows, and wherein the power range table is generated based on the stored power data by an operation of the first button, and a second button for returning to the first input screen; and automatic input means for automatically entering into an order in the first input screen, spherical power and astigmatism power of each of the right-and-left lens selected in the power range table of the second input screen, wherein when an intersection cell among intersection cells of the columns and rows of the power range table is selected by the input instruction device of the first terminal device, spherical power and astigmatism power corresponding to the selected intersection cell is automatically entered into an order in the first input screen and the order is submitted.

* * * * *